United States Patent [19]

Sakamoto et al.

[11] Patent Number: 5,189,731
[45] Date of Patent: Feb. 23, 1993

[54] CHARACTER PROCESSING SYSTEM HAVING EDITING FUNCTION

[75] Inventors: Koichiro Sakamoto, Sakai; Hiroichi Yoshida, Nara, both of Japan

[73] Assignee: Sharp Kabushiki Kaisha, Osaka, Japan

[21] Appl. No.: 532,119

[22] Filed: Jun. 1, 1990

Related U.S. Application Data

[63] Continuation of Ser. No. 184,434, Apr. 21, 1988, abandoned.

[30] Foreign Application Priority Data

Apr. 22, 1987 [JP] Japan .................................. 62-99376

[51] Int. Cl.$^5$ .............................................. G06F 15/20
[52] U.S. Cl. .................................... 395/146; 395/148; 395/117
[58] Field of Search ................ 364/518, 521, 523, 200, 364/900

[56] References Cited

U.S. PATENT DOCUMENTS

| | | | |
|---|---|---|---|
| 4,447,888 | 5/1984 | Kuecker et al. | 364/900 |
| 4,451,900 | 5/1984 | Mayer et al. | 364/900 |
| 4,504,825 | 3/1985 | Bergermann et al. | 364/523 X |
| 4,686,649 | 8/1987 | Rush et al. | 364/521 X |
| 4,751,674 | 6/1988 | Aoyagi et al. | 364/521 X |
| 4,802,104 | 1/1989 | Ogiso | 364/518 |
| 4,931,987 | 6/1990 | Kawakami | 364/900 |

OTHER PUBLICATIONS

*Timeworks, Word Writer ST User's Manual,* 1982, Timeworks, Inc., pp. 48-50.
WordPerfect Manual Version 4.2, WordPerfect Corporation 1987.

Primary Examiner—Heather R. Herndon

[57] ABSTRACT

A character processing system is disclosed which has an editing function and includes an input unit, a text-edition data memory for storing text data and edition data, a display unit, and a text-edition data buffer for temporarily storing the data to be fed to the display unit. It further includes a display controller for feeding the contents of the buffer to the display unit and checking a text on display from line to line as to whether edition data is on display. An eraser is included for erasing the edition data from the display unit in response to a display change-over instruction. Finally, an edition data analyzer is included for retrieving edition data from the memory by searching the text stored therein from line to line and thereby displays the retrieved edition data at each line concerned of the text on display.

23 Claims, 7 Drawing Sheets

FIG. 5 (a)
Text analysis

FIG. 4
Edition data erasing

FIG. 6
Analysis result display

Data table

| Line number data | Set data |
|---|---|
| 1 (H) | O F (H) |
| 3 (H) | F O (H) |
| 10 (H) | F F (H) |

Set data { OF(H) : Format set
FO(H) : Tab set
FF(H) : Format and tab set

CHARACTER PROCESSING SYSTEM HAVING EDITING FUNCTION

This application is a continuation of application Ser. No. 07/184,434 filed on Apr. 21, 1988, now abandoned.

BACKGROUND OF THE INVENTION

1. Field of the Invention

The present invention relates to a character processing system having an editing function involving format setting, proportioned layout, character magnification and other similar type processes.

The term "format" as used herein refers to the formatting of text including, for example, the size of characters, amount of line feed>and maximum number of characters.

2. Description of the Prior Art

In such character processing systems as is heretofore known, having an editing function, the text is checked from line to line during preparation of the text for data other than the text itself. For example, data as to format setting or tab setting is checked by changing over a screen from a display of the text being prepared to a layout display, and checking the locations where a tab setting is made or a particular format is set. Sometimes printing out of the text prepared and checking the layout of the print is performed.

Unexamined Japanese Patent Publication SHO 57-178563 further discloses a character processing system which is adapted to prepare a text with formats set for a plurality of areas and in which, when it is desired to alter the format of the text in a particular area, the text can be searched from area to area for the format, and the format can be retrieved on a display.

However, the character processing systems of both types are unable to display, on the text preparing screen, how many items of edition data, for example, as to format setting, or tab setting are set in a particular line of the text. Accordingly, when a different format has been set in the text, it is impossible to immediately locate the line in which the format is changed. Thus, the systems contain a drawback in that it is impossible to recognize how the text being prepared is being edited on the text preparing screen.

SUMMARY OF THE INVENTION

The present invention provides a character processing system having an editing function and comprising an input device for entering text data and various instructions; text-edition data memory device for storing the text data and various items of edition data for the text data which are given by various instructions concerning items such as formats, justification or character expansion; display device for displaying text data and various items of edition data; text-edition data temporary storage device for temporarily storing the text data and the edition data set for text data to be fed to the display device; display control device for reading out data from the text-edition data temporary storage device in response to an instruction from the input device to feed the data to the display device and check the text shown on the display device from line to line for edition data; edition data erasing device for erasing edition data on display when the edition data is recognized by the display control device in response to a display change-over instruction from the input device; and edition data analyzing device or searching the text stored in the text-edition data memory device from line to line for edition data and outputting the retrieved edition data to the text on display at each line concerned, when the display control device recognized no edition data on display in response to the display change-over instruction from the input device.

The main object of the present invention is to provide a character processing system having an editing function and adapted to display, on a text preparing screen, various items of edition data set for the text shown on the screen, when so required, so as to prepare texts with an improved efficiency.

According to the invention, edition data can be displayed for the text at each line concerned in response to an instruction from the input device as required, so that texts can be prepared efficiently and accurately. Furthermore, the limited display area on the screen of the display device can be utilized to the greatest possible extent by erasing the edition data which need not be displayed. This also assures efficient preparation of texts.

DESCRIPTION OF THE PREFERRED EMBODIMENTS

Figure 1:
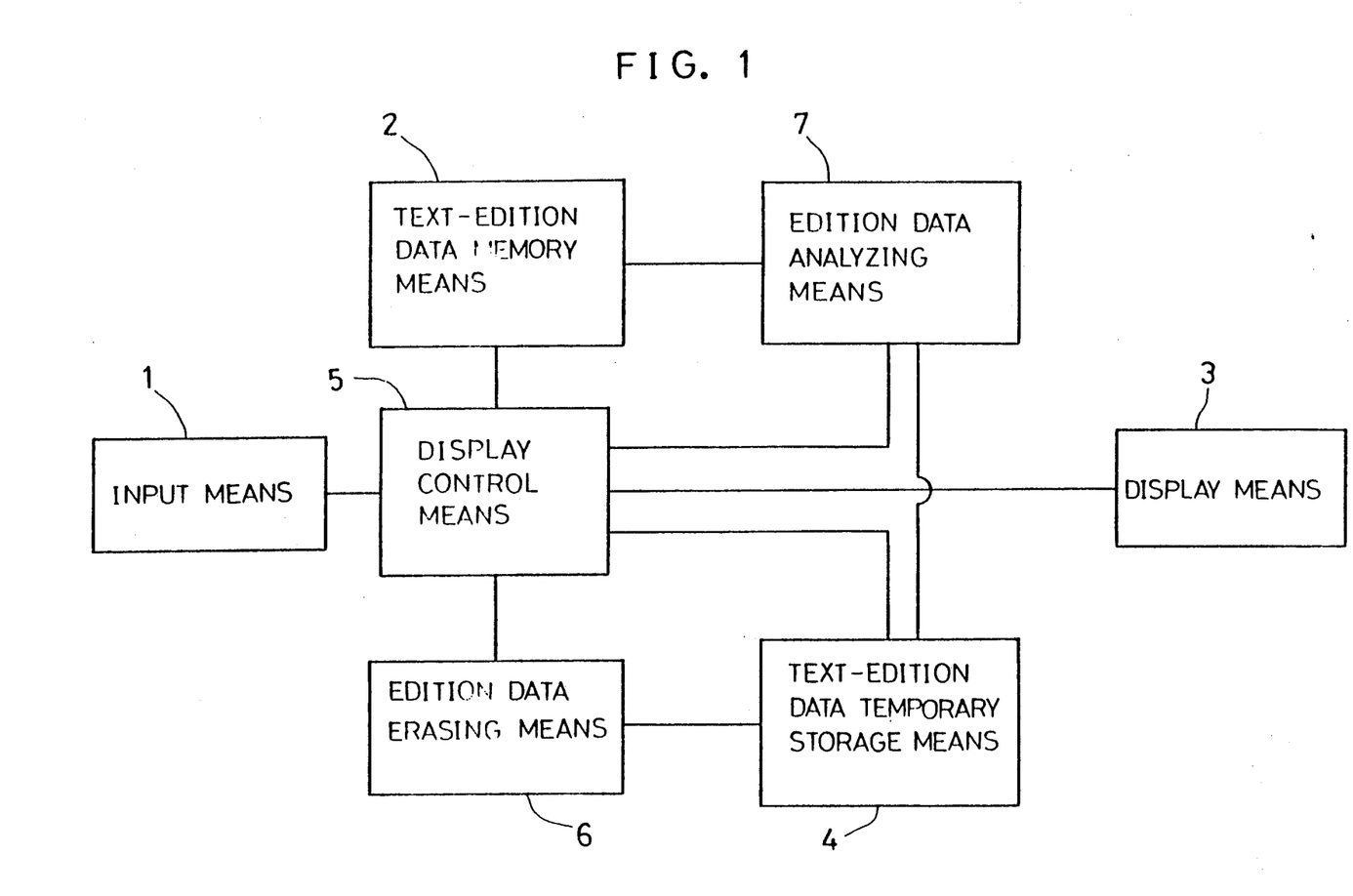
FIG. 1 is a block diagram showing the basic construction of a character processing system of the invention having an editing function.

FIG. 1 is a block diagram showing the basic construction of a character processing system of the invention having an edition function.

Indicated at 1 is an input device for entering text data and various instructions. Indicated at 2 is a text-edition data memory device for storing text data and various items of edition data for the text data which are given by the various instructions of items such as formats, justification or character expansion. Indicated at 3 is a display device for displaying text data and various items of edition data. Indicated at 4 is a text-edition data temporary storage device for temporarily storing the text data and the edition data set for the text data to feed these items of data to the display device 3. Indicated at 5 is a display control device for reading out data from the text-edition data temporary storage device 4 in response to an instruction from the input device 1 to feed the data to the display device 3 and further checking the text shown on the display device 3 from line to line for edition data. Indicated at 6 is an edition data erasing device for erasing edition data on the display when the edition data is recognized by the display control device 5 in response to a display change-over instruction from the input device 1. Indicated at 7 is an edition data analyzing device for searching the text stored in the text-edition data memory device 2 from line to line for edition data and outputting the retrieved edition data to the text on display at each line concerned, when the display control device 5 has recognized no edition data on display in response to the display change-over instruction from the input device 1.

An embodiment of the invention will be described below which is a character processing system having the above basic construction and an editing function.

Figure 2:
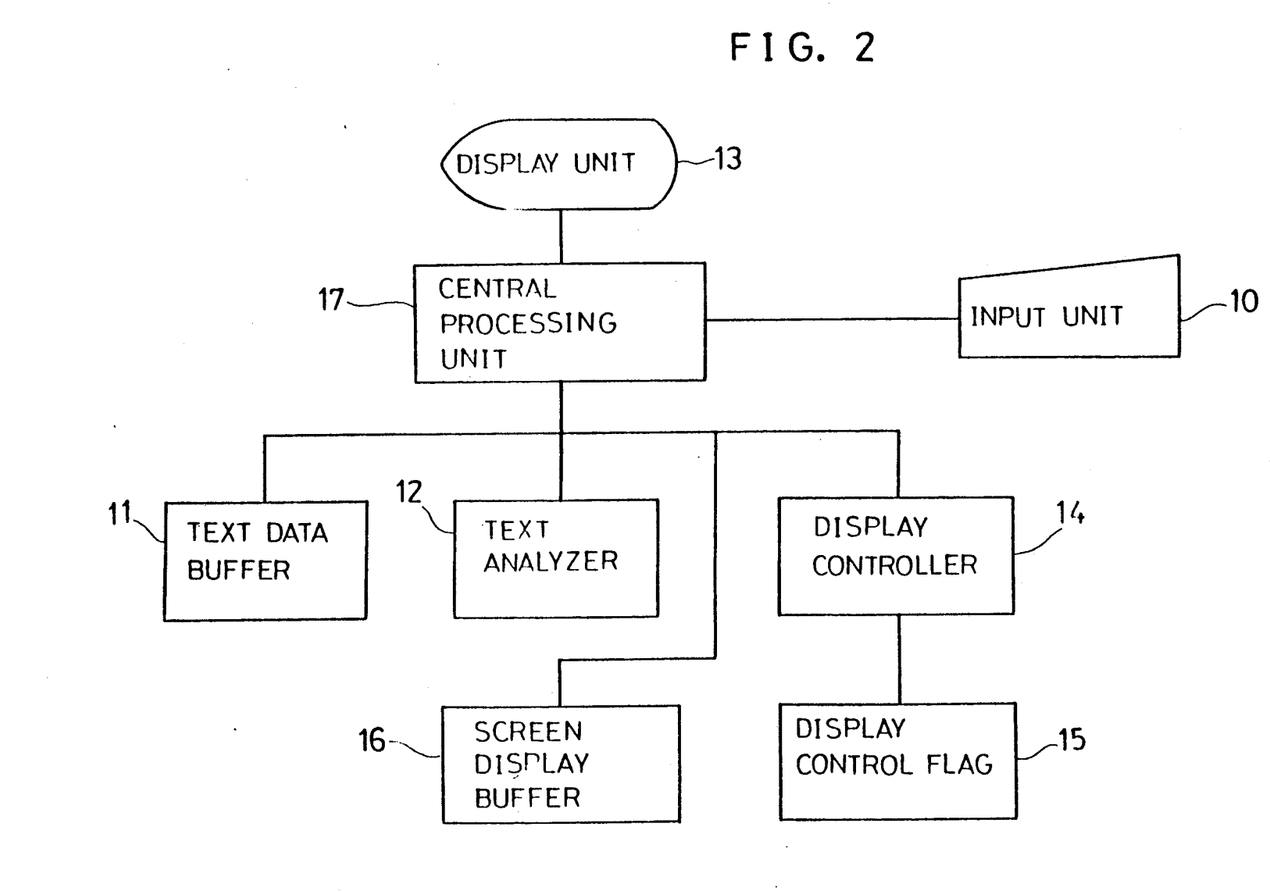
FIG. 2 is a block diagram showing the construction of a Japanese word processor embodying the invention.

FIG. 2 is a block diagram showing the construction of a preferred embodiment, i.e., a Japanese word processor. The embodiment has an input unit 10 serving as the input device and comprising: a keyboard which has character input keys for preparing texts; a store key for storing the text prepared; a recall key for recalling the text prepared; edition data setting keys for setting various items of edition data concerning format setting, tab setting, etc., instruction keys for entering various instructions; and a change-over key for giving an instruction to cause a display unit 13 to display edition data for the text shown thereon at each line concerned or to erase edition data from the text on display.

The text data and edition data output from the input unit 10 is fed to a central processing unit 17. The central processing unit 17, which comprises a 16-bit microcomputer, has a text analyzer, a screen display buffer and a display controller to be described later. It performs the function of the edition data analyzing device, the display device means, the edition data erasing device and the text-edition data temporary storage device according to a program stored in an unillustrated ROM. The central processing unit 17 further reads out text data and various items of edition data from a text data buffer 11 serving as the text-edition data memory device and feeds these items of data to the display unit 13.

The display unit 13 comprises, for example, a CRT or LCD and displays the text data entered from the input unit 10, the text data retrieved from the text data buffer 11, and the edition data set for the retrieved text data, etc. The text data and various items of edition data entered by the input unit 10 are stored via the central processing unit 17 in the text data buffer 11, which usually comprises an external memory device such as a floppy disk. In response to an instruction from the central processing unit 17, the text analyzer 12, which serves as the text-edition data analyzing device, inquires of the text data buffer 11 what edition data is set for each line of the text stored therein. It then feeds the result of analysis to the screen display buffer 16 serving as the text-edition data temporary storage device and to be described below.

The text data stored in the text data buffer 11 is displayed in a specified display area of the display unit 13 under the control of the display controller 14 in response to an instruction given thereto by the central processing unit 17. The edition data stored in the text data buffer 11 is displayed in the form of symbols at the heads of respective lines of the text data shown on the display unit 13. The display controller 14 has a display control flag 15, which is "on" when the edition data is shown on the display unit 13. The screen display buffer 16 temporarily stores the text data and edition data output from the display controller 14.

Next, the preferred operation of the embodiment will be described with reference to the flow charts of FIG. 3 to 6. It is assumed that text data and some items of edition data entered by the input unit 10 are presented on the display unit 13 and are stored in the text data buffer 11. The items of edition data in the following description of the embodiment are format and tab data items.

Figure 3:
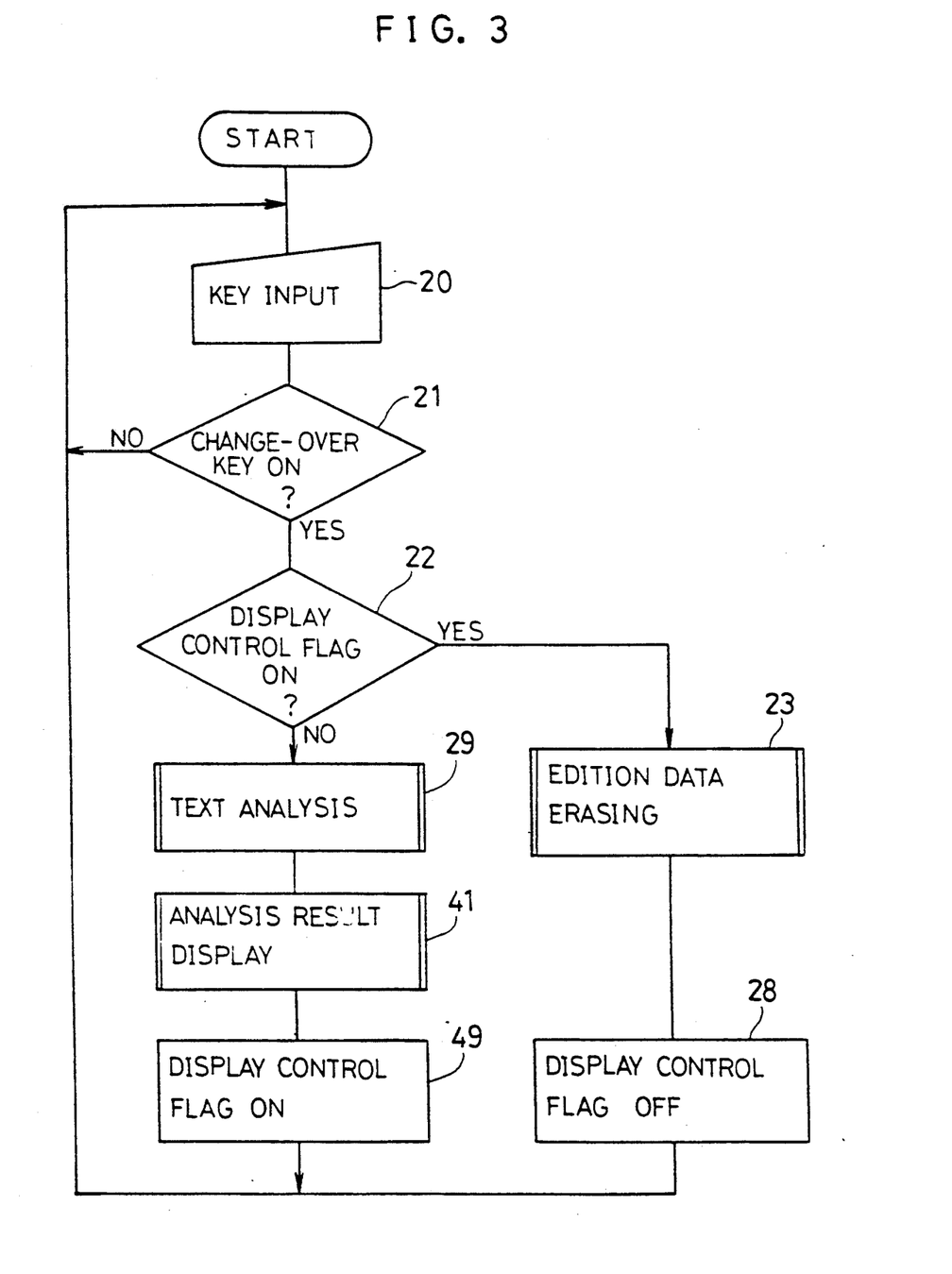
FIGS. 3 to 6 are flow charts illustrating the operation of the embodiment.

First, the operator actuates the change-over key on the input unit 10 to give an instruction for a change-over of the text data (steps 20, 21), whereupon the central processing unit 17 instructs the display controller 14 to check the display unit 13 as to whether edition data as to tab setting, justification, character expansion, etc. is currently on display. In response to the instruction, the display controller 14 checks the display control flag 15 and transfers, to the central processing unit 17, the result as to whether the edition data is on display.

When the display control flag 15 is "on", indicating that the edition data is on display (step 22), the central processing unit 17 instructs the display controller 14 to erase the edition data from the screen of the display unit 13. Thus, the display controller 14 erases the edition data from the screen display buffer 16 as specified by the erasing instruction (step 23).

Figure 4:
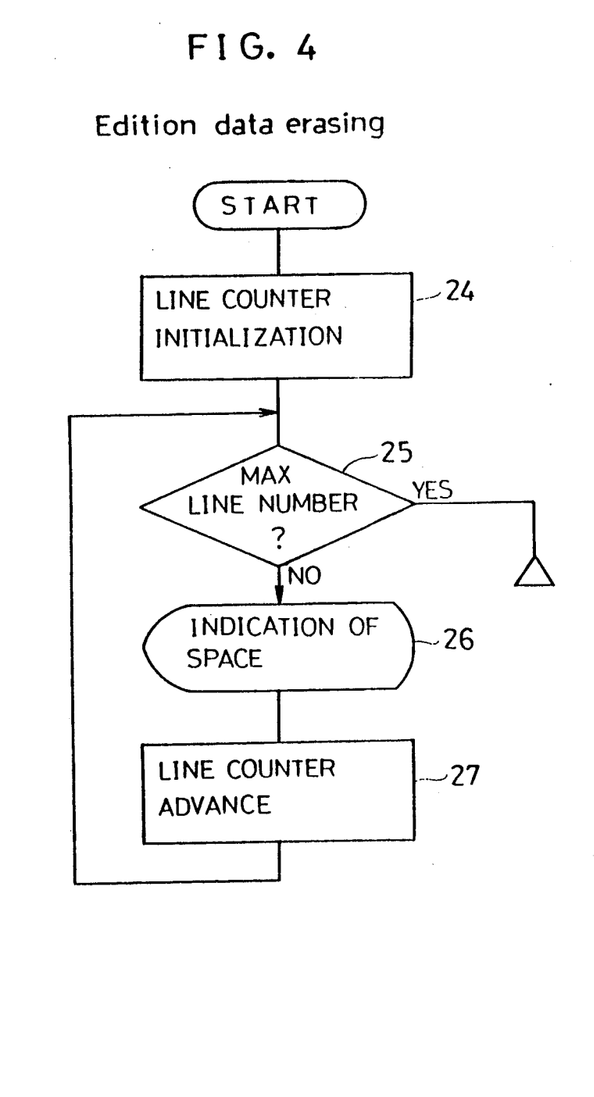
Figure 5:
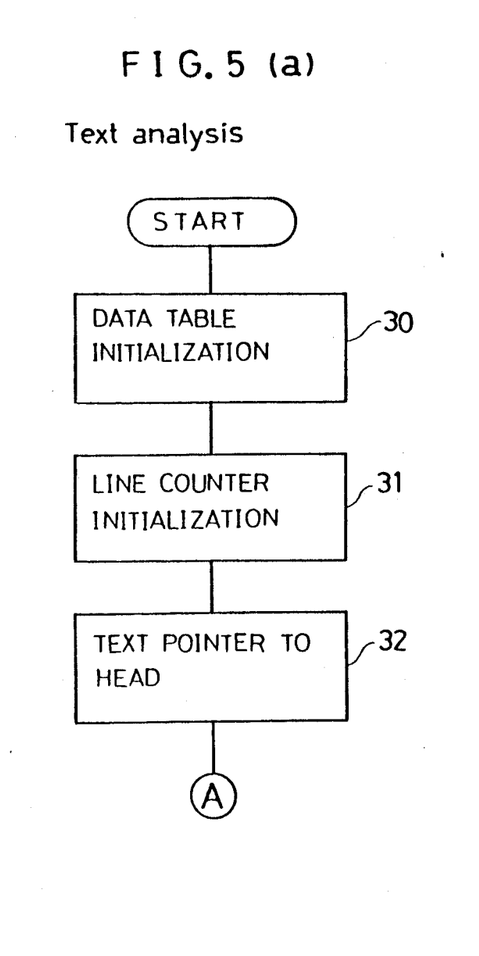

The flow chart of FIG. 4 shows the procedure for erasing the edition data. First, a line counter is initialized to set the erasing start position at the head line of the text (step 24). Then, at step 25, it inquires whether all the lines on the display unit 13, available for display, are used for the text. If the inquiry is answered in the negative, an indication of space (vacancy) is given at the portion where the edition data is erased (step 26). The line counter is then advanced by 1 for processing the subsequent lines (step 27). If the answer to the inquiry of step 25 is affirmative, the edition data is erased, followed by the subsequent step . The data (text data) remaining unerased in the screen display buffer 16 is held on display on the unit 13 by the central processing unit 17. The display control flag 15 is then turned "off" (step 28).

When the display control flag 15 is found to be "off" in step 22, indicating that no edition data is on display, the central processing unit 17 instructs the text analyzer 12 to analyze the data stored in the text data buffer 11 (step 29).

Figures 7, 8:
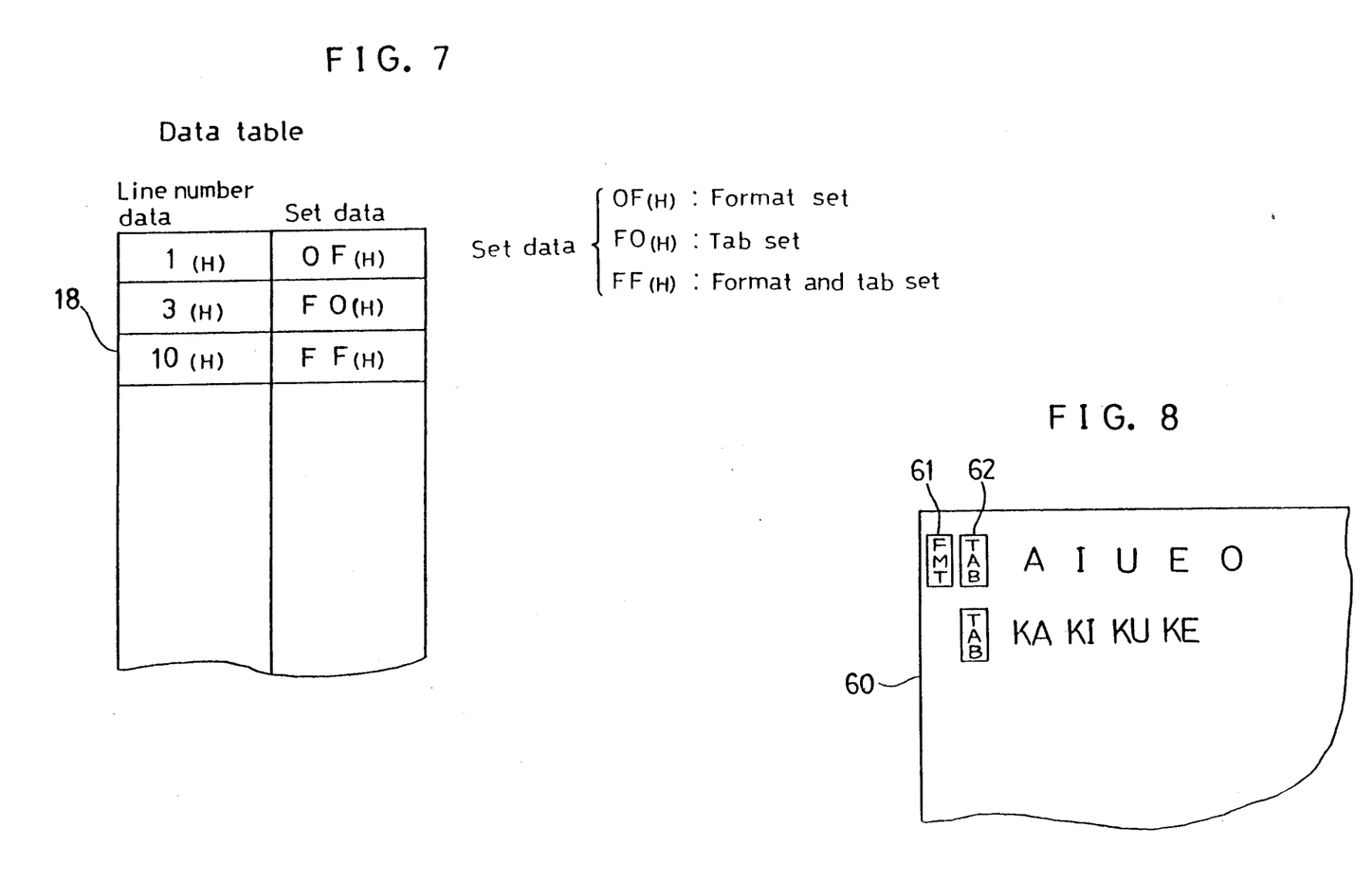
FIG. 7 is a diagram showing a data table for use in the embodiment.
FIG. 8 is a diagram showing an example of edition data given on a display by the operation of the embodiment.

With reference to the flow charts of FIGS. 5(a), 5(b), the text is analyzed by the following procedure. First, a data table provided in the text analyzer 12 is initialized (step 30), and the line counter is then initialized (step 31). As seen in FIG. 7, the data table 18 comprises a store for storing the line number data and a store for storing the set edition data. When the edition data to be handled involves format setting and tab setting, for example, the set data includes "OF" (format set), "FO" (tab set) and "FF" (format and tab set), i.e. three data items.

After the initialization of the data table 18 and the line counter, the text analysis start position is set at the head of a text pointer (step 32), and the text data indicated by the pointer is read out of the text data buffer 11 (step 33). The text data thus read out contains various items of edition data.

Next, the text data is checked to see if format data is set therefor (step 34). If the format data is found to be set, "OF" is registered in the set data store of the data table 18. If otherwise, step 36 checks whether tab data is set for the text data. When it is set, "FO" is registered in the set data store of the data table 18. When format and tab data are found to be set, "FF" is registered in the set data store of the data table 18. If no tab data is found to be set in step 36, step 37 inquires whether the data for one line of the text has been completely retrieved. When the answer is affirmative, the line counter is advanced by 1 (step 38), and step 39 subsequently inquires whether the data for the whole sentence has been completely retrieved. If the answer to step 39 is negative, the text pointer is advanced (step 40). The sequence returns to step 33 to repeat the foregoing steps 33 to 39.

Upon completion of the analysis of the text, the result of analysis is displayed (step 41).

Figure 6:
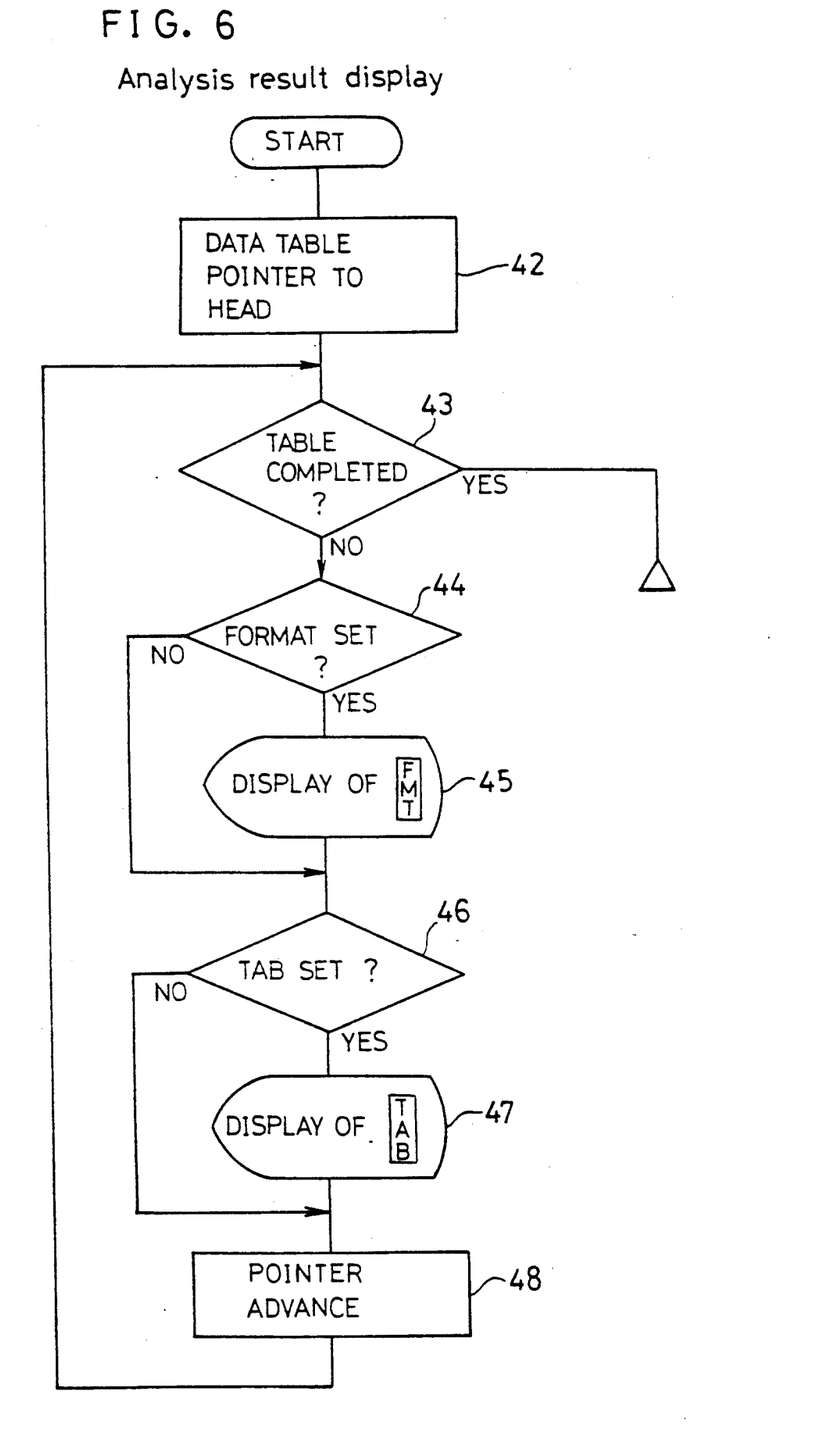

The flow chart of FIG. 6 shows the procedure for displaying the analysis result. First, a data table pointer is brought to the head position (step 42), and step 43 inquires whether display for the data table 18 has been completed. If the answer is negative, step 44 inquires whether format data is registered. When the format data is registered, a format data symbol is displayed at the specified line (step 45). Next, step 46 inquires whether tab data is registered. If it is registered, a tab data symbol is displayed at the specified line (step 47). The pointer is then advanced (step 48), followed by step 43 again for the display of analysis result for the next line. Upon the completion the analysis of the display result for the entire data table 18, the display control flag is set to an "ON" state (step 49), whereby the edition data is displayed at each line concerned of the text shown on the text preparing screen.

FIG. 8 is a diagram showing an example of edition data shown on the screen 60 of the display unit 13. An item of format data 61 and an item of tab data 62 are shown at the head of the first line of the text on display. These data items are symbolized by respective particular characters.

As will be apparent from the diagram, format and tab setting are made for the first line of the text "A I U E O", the HIRAGANA characters and tab setting only is made for the "KA KI KU KE" in HIRAGANA characters.

The display enables the operator to readily recognize the edition data set for the text.

Although only format and tab setting data is shown to be displayed according to the present preferred embodiment, other items of edition data (such as justification and character expansion) may be similarly displayed.

Although the preferred embodiment described above is a Japanese character processing system, on embodiment can of course be adapted for use in an English character processing system.

What is claimed is:

1. A character processing system having an edition function, the system comprising:
   input means for entering text data and edition data,
   text-edition data memory means for storing the text data and the edition data for the text data, the edition data corresponding to items including formats, justification and character expansion;
   display means for displaying said text data in a format and said edition data;
   text-edition data temporary storage means for temporarily storing the text data and the edition data for the text data to be fed to the display means;
   said input means inputting an instruction to display text and edition data;
   display control means for controlling of reading text and edition data;
   display control means for controlling of reading text edition data out from the text-edition data temporary storage means in response to said instruction from the input means to display text and edition data collectively on the display means, said edition data being displayed only at a head of text data lines, while maintaining the display of said text data format unaltered, and checking the data shown on said display means from line to line for recognition of edition data;
   said input means inputting a display change over instructions;
   edition data erasing means for erasing edition data on display, when the edition data is recognized by the display control means, in response to said display change-over instruction from the input means while maintaining the display of said text data format unaltered, and
   edition data analyzing means for searching the text data stored in the text-edition data memory means from line to line for edition data and outputting the recognized edition data corresponding to the text data on display at each line concerned, when the display control means recognized no edition data on display in response to the display change-over instruction from the input means.

2. A system as defined in claim 1 wherein the input means comprises a keyboard input device.

3. A system as defined in claim 2 wherein the keyboard input device has a key for inputting edition data so as to correspond with text data, and a change-over key for causing the display means to display edition data at the head of text data lines while maintaining the display of said text data format unaltered, thereon and erase edition data from the display means while maintaining the text data format unaltered.

4. A system as defined in claim 1 wherein the display means comprises a cathode-ray tube.

5. A system as defined in claim 1 wherein the text-edition data temporary storage means comprises a screen display buffer.

6. A system as defined in claim 1 wherein the display control means comprises a display control flag which is on when edition data is displayed on the display means and off when edition data is not displayed on the display means.

7. A method, in a character processing system for editing text data, comprising the steps of:
   a. inputting text data;
   b. storing said text data;
   c. displaying said text data in a line by line format;
   d. inputting edition data corresponding to each line;
   e. storing said text data and its corresponding edition data in the form of a data table;
   f. displaying all lines of inputted text data and corresponding edition data concurrently, said edition data being displayed with corresponding lines of text data at a beginning of each line display of the text data;
   g. inputting a display change-over instruction; and
   h. erasing all of said displayed edition data in response to said inputted display change-over instruction, said format display of text data remaining unaltered.

8. A method, as claimed in claim 7, wherein said change-over instruction is inputted upon all necessary edition data being displayed.

9. A method, as claimed in claim 7, wherein said inputted text data, edition data, and change-over instruction are inputted through a keyboard.

10. A method, as claimed in claim 7 wherein said edition data may be in the form of at least one of format, justification, and character expansion.

11. A method, in a character processing system, for editing text data, comprising the steps of:
   a. inputting text data in a line by a line process;

b. storing each inputted line of text data sequentially and cumulatively;

c. displaying each line of text data, sequentially and cumulatively in a format;

d. checking each sequentially displayed line of text data for the presence of edition data;

e. setting a flag off upon finding no edition data is displayed;

f. inputting edition data, in a line by line process, corresponding to each line of text data;

g. storing each line of text data and its corresponding edition data in the form of a data table;

h. displaying each of said lines of text data and their corresponding edition data, sequentially and cumulatively upon completion of said data table, the edition data being at the head of the lines, said edition data being displayed with each while maintaining the display of said text data format unaltered.

12. A method, as claimed in claim 11, further comprising the steps of:

i. inputting a display change-over instruction;

j. re-checking said displayed text data and corresponding edition data for the presence of edition data in response to said change-over instruction;

k. setting said flag on in response to finding edition data has been displayed;

l. erasing all of said displayed edition data, while maintaining an unaltered display of all of said text data, in response to said flag being on.

13. A method, as claimed in claim 11, wherein said change-over instruction is inputted upon all necessary edition data being displayed.

14. A method, as claimed in claim 11, wherein said inputted text data, edition data, and change-over instruction are inputted through a keyboard.

15. A method, as claimed in claim 11, wherein said edition data may be in the form of at least one of format, justification, and character expansion.

16. A character processing system for editing text data, comprising:

input means of inputting text data;

text-edition data memory means for storing said inputted text data, operatively connected to said input means;

display means for displaying said text data in a line by line format, operatively connected to said text-edition data memory means;

said input means inputting edition data corresponding to each line of text data;

said text-edition data memory means storing said text data and its corresponding edition data in the form of a data table;

said display means displaying all lines of inputted text data and their corresponding edition data concurrently in response to the completion of said data table, with the edition data being located at the head of the lines of text data, said edition data being displayed with corresponding lines of text data while maintaining the display of text data format unaltered;

said input means selectively inputting a display change-over instruction; and edition data erasing means for erasing all of said displayed edition data, while maintaining said unaltered display text data format, in response to said inputted display change-over instruction.

17. A system, as claimed in claim 16, wherein said change-over instruction is inputted upon all necessary edition data being displayed.

18. A system, as claimed in claim 16, wherein said inputted text data, edition data, and change-over instruction are inputted through a keyboard.

19. A system, as claimed in claim 16 wherein said edition data may be in the form of at least one of format, justification, and character expansion.

20. A character processing system, for editing text data, comprising:

input means for inputting text data in a line by line process;

text-edition data memory means for storing each inputted line of text data sequentially and cumulatively, operatively connected to said input means;

display means for displaying each line of text data, sequentially and cumulatively, operatively connected to said text-edition data memory means;

display control means for controlling checking each sequentially displayed line of text data for the presence of edition data, operatively connected to said display means;

said display control means controlling setting of a flag off upon finding no edition data is displayed;

said input means for inputting edition data, in a line by line process, corresponding to each line of text data;

said text edition data memory means storing each line of text data and its corresponding edition data in the form of a data table;

said display means displaying each of said line of text data in a format and their corresponding edition data, sequentially and cumulatively upon completion of said data table said edition data being displayed with corresponding lines of text data at the head of the lines of text data while maintaining the display of the text data format unaltered.

21. A system, as claimed in claim 20, further comprising:

said input means inputting a display change-over instruction;

said display control means controlling rechecking of said displayed text data and the corresponding edition data for the presence of edition data in response to said change-over instruction;

said display control means controlling setting of said flag on in response to finding edition data has been displayed;

edition data erasing means for erasing all of said displayed edition data, while maintaining said unaltered displayed text data, in response to said flag being on.

22. A system, as claimed in claim 20, wherein said inputted text data, edition data, and change-over instruction are inputted through a keyboard.

23. A system as claimed in claim 20, wherein said edition data may be in the form of at least one of format, justification, and character expansion.

* * * * *